United States Patent
Talton et al.

(10) Patent No.: US 9,588,523 B2
(45) Date of Patent: Mar. 7, 2017

(54) MULTI-STREAM COMPRESSOR MANAGEMENT SYSTEM AND METHOD

(71) Applicant: FLOGISTIX, LP, Oklahoma City, OK (US)

(72) Inventors: Mims Talton, Nichols Hills, OK (US); Aaron Baker, Pampa, TX (US)

(73) Assignee: Flogistix, LP, Oklahoma City, OK (US)

( * ) Notice: Subject to any disclaimer, the term of this patent is extended or adjusted under 35 U.S.C. 154(b) by 0 days.

(21) Appl. No.: 14/416,182

(22) PCT Filed: Jul. 23, 2013

(86) PCT No.: PCT/US2013/051635
§ 371 (c)(1),
(2) Date: Jan. 21, 2015

(87) PCT Pub. No.: WO2014/018510
PCT Pub. Date: Jan. 30, 2014

(65) Prior Publication Data
US 2015/0241883 A1    Aug. 27, 2015

Related U.S. Application Data

(60) Provisional application No. 61/674,640, filed on Jul. 23, 2012.

(51) Int. Cl.
| | | |
|---|---|---|
| G05D 16/20 | (2006.01) |
| F17D 1/07 | (2006.01) |
| G05B 19/05 | (2006.01) |
| F04B 41/00 | (2006.01) |
| F04B 49/02 | (2006.01) |
| F04B 49/06 | (2006.01) |
| F04B 49/08 | (2006.01) |

(52) U.S. Cl.
CPC ............. *G05D 16/20* (2013.01); *F04B 41/00* (2013.01); *F04B 49/022* (2013.01); *F04B 49/065* (2013.01); *F04B 49/08* (2013.01); *F17D 1/07* (2013.01); *G05B 19/058* (2013.01); *F04B 2205/01* (2013.01); *G05B 2219/14006* (2013.01)

(58) Field of Classification Search
CPC .................. G05D 16/20; G05B 19/058; G05B 2219/14006; F17D 1/07
See application file for complete search history.

(56) References Cited

U.S. PATENT DOCUMENTS

| | | | |
|---|---|---|---|
| 4,462,813 A | * | 7/1984 | May .......................... C07C 7/09 62/613 |
| 4,579,565 A | | 4/1986 | Heath |
| 4,682,620 A | | 7/1987 | Goebel et al. |

(Continued)

FOREIGN PATENT DOCUMENTS

| | | |
|---|---|---|
| CA | 2562707 | 4/2008 |
| CN | 201546957 U | 8/2010 |

*Primary Examiner* — Nathan L Laughlin
(74) *Attorney, Agent, or Firm* — McAfee & Taft, PC

(57) ABSTRACT

This disclosure describes a natural gas collection system utilizing a single compressor to manage collection of natural gas from both high-pressure and low-pressure sources. The operation of the single compressor is controlled by a PLC configured to receive pressure data from sensors and to direct compressor speed in order to maintain natural gas pressure at the user defined targets.

32 Claims, 10 Drawing Sheets

(56) References Cited

U.S. PATENT DOCUMENTS

| | | | |
|---|---|---|---|
| 6,697,713 B2* | 2/2004 | Megan | G05D 16/20 |
| | | | 137/119.03 |
| 6,701,223 B1 | 3/2004 | Rachford, Jr. et al. | |
| 7,013,978 B2* | 3/2006 | Appleford | E21B 43/36 |
| | | | 166/105.5 |
| 7,415,995 B2* | 8/2008 | Plummer | F17C 6/00 |
| | | | 141/192 |
| 7,503,409 B2 | 3/2009 | Brookover | |
| 2006/0009881 A1* | 1/2006 | Ferber | G05D 7/0647 |
| | | | 700/282 |
| 2006/0263283 A1 | 11/2006 | Egan | |
| 2007/0110596 A1 | 5/2007 | Weeber et al. | |
| 2007/0158075 A1* | 7/2007 | Beg | E21B 43/124 |
| | | | 166/370 |
| 2007/0260333 A1* | 11/2007 | Peureux | F17D 1/04 |
| | | | 700/28 |
| 2008/0085180 A1 | 4/2008 | Mackenzie | |
| 2011/0247323 A1 | 10/2011 | Kenway | |
| 2011/0302923 A1* | 12/2011 | Hartono | F01K 13/00 |
| | | | 60/716 |
| 2012/0121376 A1* | 5/2012 | Huis In Het Veld | F04D 27/0207 |
| | | | 415/1 |
| 2013/0248000 A1* | 9/2013 | Killeen | F17D 3/00 |
| | | | 137/14 |

* cited by examiner

MULTI-STREAM COMPRESSOR MANAGEMENT SYSTEM AND METHOD

CROSS RELATED

This application claims the benefit of previously filed International Application PCT/US2013/051635 filed Jul. 23, 2013, and Provisional Application Ser. No. 61/674,640 filed on Jul. 23, 2012.

BACKGROUND

Safe and economical transportation and storage of liquid and gaseous hydrocarbons requires the proper management of compressors associated with petroleum well production sites, processing facilities and transportation lines. For example, liquid hydrocarbon storage tanks typically have an internal vapor pressure of about 1.72 KPa (0.25 psig); however, failure to properly control the pressure in the tanks or the vapor recovery towers associated with liquid hydrocarbon storage tanks can result in tank failure and collapse of the structure. In the production unit or heater treater often associated with a natural gas well, pressure is typically maintained at about 172.4 KPa to 206.8 KPa (25 to 30 psig). Excessively low pressures within these units can render the liquid transfer and dumping systems inoperable.

To accommodate the wide range of operating conditions within the production, processing and transportation systems, the industry utilizes several individually controlled compressors with each compressor being associated with its own programmable logic controller or PLC. The plurality of compressors increase operating costs at wells sites and processing facilities. Thus, the ability to reduce the number of compressors required to manage hydrocarbon processing and production will decrease costs and reduce the footprint associated with production facilities.

SUMMARY

In one embodiment, the present invention provides a system configured to monitor and manage natural gas pressure. The system of the present invention comprises at least one low-pressure source of natural gas and at least one high-pressure source of natural gas. A high-pressure line provides fluid communication between the high-pressure source and a "T" or junction. Additionally, a low-pressure line provides fluid communication between the low-pressure source of natural gas and the "T" or junction. Another line provides fluid communication between the "T" or junction and the inlet of a compressor. The system includes two pressures sensors. One pressure sensor monitors the gas pressure at the inlet to the compressor. Another pressure sensor is remotely located. The compressor is driven by a drive mechanism such as but not limited to an internal combustion engine or an electric motor. Control of the drive mechanism is provided by a programmable logic controller. The programmable logic controller is configured to receive input data from the pressure sensor monitoring the gas pressure at the inlet and configured to receive input data from the remote pressure sensor. Additionally, the programmable logic controller is configured to provide output data suitable for controlling the operation of the drive mechanism, thereby controlling the operational speed and capacity of the compressor.

Further, the present invention provides a method, using a single compressor, for recovering natural gas from both high-pressure natural gas sources and low-pressure natural gas sources. The method of the present invention comprises the recovery of natural gas from at least one high-pressure source of natural gas and the recovery of natural gas from at least one low-pressure source of natural gas. Additionally, the method includes the establishment of target natural gas pressures. The method uses a first pressure sensor to monitor said natural gas pressure of said low-pressure source of natural gas thereby producing a signal corresponding to said monitored pressure. Further, the method uses a second pressure sensor to monitor said natural gas pressure of said high-pressure source of natural gas thereby producing a signal corresponding to said monitored pressure. Both pressure values are communicated to a programmable logic controller configured to interpret said monitored pressure values. The programmable logic controller determines if said monitored pressure values correspond to the established targets. If the monitored pressure values do not correspond to the established targets, then the programmable logic controller directs the increase or decrease of compressor capacity by directing a drive mechanism operating said compressor to increase or decrease operational speed. Upon the subsequent establishment of the target pressure, the programmable logic controller directs the drive mechanism to maintain compressor speed until a subsequent variation from the target values is detected.

DETAILED DESCRIPTION

Figure 1:
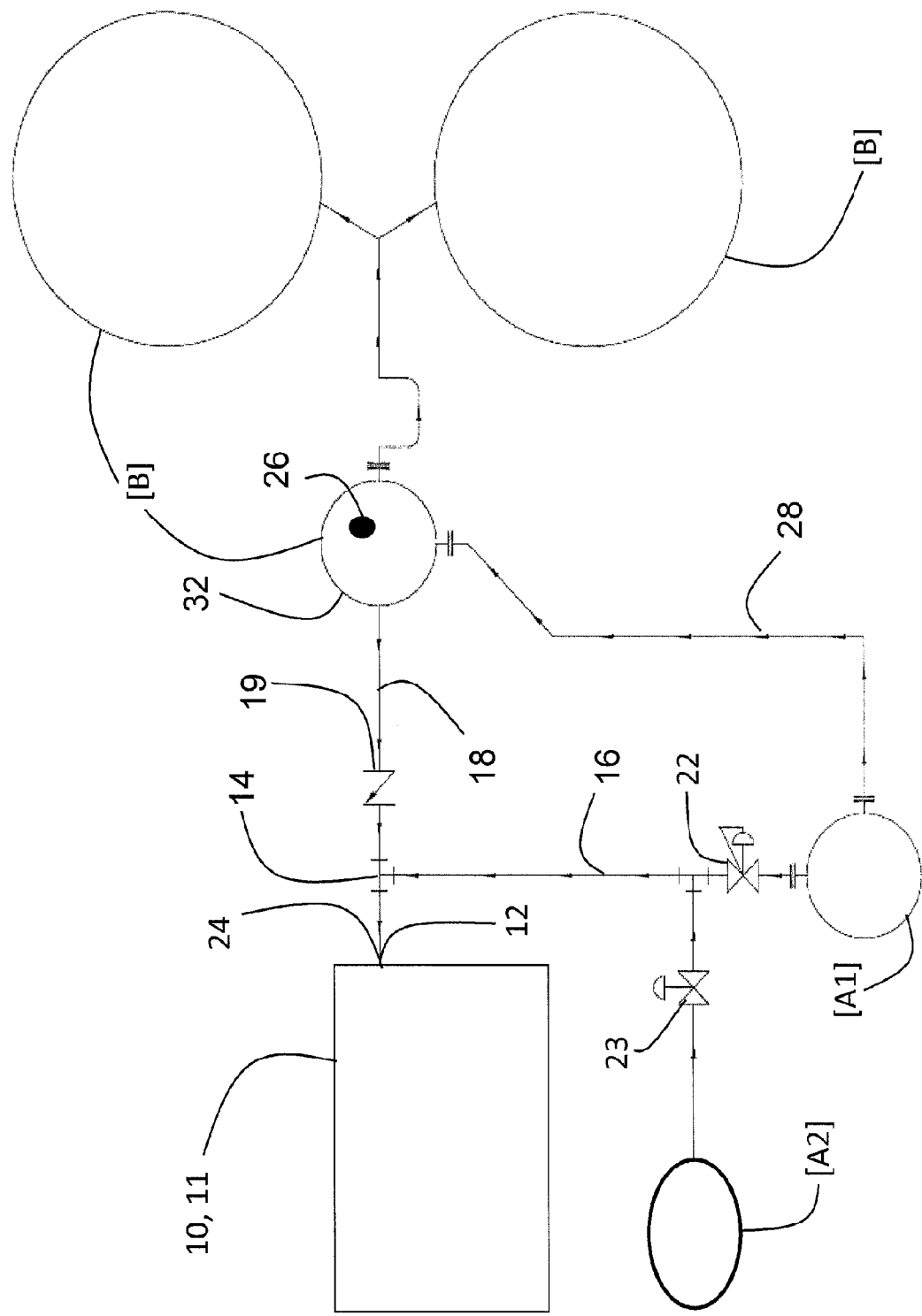
FIGS. 1 and 2 depict configurations of the present invention with two high-pressure sources and a vapor recovery tower as the monitored low-pressure source of hydrocarbon gas.

To reduce the number of compressors required to manage line and apparatus gas pressure and flow, the present invention utilizes a Programmable Logic Controller (PLC) programmed to manage both high- and low-pressure lines. Those skilled in the art are well versed in the use of a PLC. Further, one skilled in the art will readily understand how to program a conventional PLC associated with a compressor to achieve the purposes of the current invention and one skilled in the art understands the PID calculations incorporated into the programs associated with the PLC programming. Examples of multiple and cascading PIDs appropriate for use in the present invention are provided below.

In general terms, pressure control for a given source requires precision control over compressor operation. As known to those skilled in the art, a change in speed will effect a change in compressor capacity. Additionally, a change in gas volume displaced will affect gas pressure.

As depicted in the FIGS., the compressor 10 has a single gas inlet 12. Upstream of gas inlet 12 is a tee or junction 14. Tee 14 combines gas from two different input lines 16, 18.

Input line 16 receives gas from any of a number of high-pressure sources [A] and input line 18 receives gas from any of a number of low-pressure sources [B]. Input line 18 includes a valve, such as check valve 19, suitable for precluding flow of high-pressure gas from the high-pressure sources [A] into the low-pressure sources [B]. PLC 11 provides operational control of compressor 10 based on data received from pressure sensors. PLC 11 provides flexibility to the disclosed system as it is readily adaptable to a wide variety of operating environments. PLC 11 is suitable for use with either a conventional natural gas compressor driven directly by an electric motor with a variable frequency drive (VFD) or a natural gas compressor driven by an internal combustion engine. PLC 11 will be programmed for the specific drive unit associated with the compressor. For example, when managing operation of a compressor driven by an electric motor, PLC 11 may be programmed to monitor various electronic variables such as, but not limited to, amperage. When managing the operation of a compressor driven by an internal combustion engine, PLC 11 may be programmed to monitor the various engine systems such as but not limited to oil pressure and oxygen content in the exhaust. Although the sequence of operations for each remain the same, the PLC panel, including monitoring instrumentation, will vary between differing types of compressor packages.

As used herein, high- and low-pressure sources, [A] and [B] respectively, are relative terms determined by the operational units, i.e. the natural gas sources, managed by compressor 10 and PLC 11. A source is a high-pressure source [A] provided it has an operational pressure greater than the total pressure within the low-pressure line 18. High-pressure line 16 may receive gas from a plurality of sources. Each high-pressure source may have a discrete output line in fluid communication with high-pressure line 16. Alternatively, each high-pressure source may be in fluid communication with a manifold (not shown). The manifold provides fluid communication between the plurality of high-pressure sources and high-pressure line 18. Likewise, each low-pressure source [B] may have a discrete output line in fluid communication with low-pressure line 18 or each low-pressure source [B] may be in fluid communication with a manifold that provides fluid communication with low-pressure line 18.

Associated with each high-pressure source [A] is pressure control valve. Suitable pressure control valves include a backpressure regulator 22 or a suction controller 23. Selection of either backpressure regulator 22 or suction controller 23 will depend on the nature and operating conditions of the high-pressure source. As known to those skilled in the art, suction controllers 23 regulate the downstream pressure limiting the flow of gas from the high-pressure source as need based on downstream equipment capabilities. Backpressure regulator 22 or suction controller 23 may be located either between the high-pressure source [A] and the manifold or between the high-pressure source [A] and line 16. Alternatively, backpressure regulator 22 or suction controller 23 may be located immediately at tee 14 joining high-pressure line 16 and low-pressure line 18 to compressor 10. Thus, at least one backpressure regulator 22 or suction controller 23 is found between tee 14 and the high-pressure source(s) [A], thereby ensuring that each high-pressure source [A] is regulated as required by the downstream equipment. Accordingly, one chooses either backpressure regulator 22 or suction controller 23 to ensure proper line pressure for operational conditions of the high-pressure source [A].

In most embodiments, PLC 11 receives high-pressure input data from a pressure sensor 24 located at the compressor inlet 12. One suitable pressure sensor is a pressure transducer. Alternatively, remote pressure sensor 26 may be associated with a high-pressure source. When the high-pressure source is monitored by remote sensor 26, local sensor 24 at inlet 12 will be monitoring the low-pressure source. For example, when the high-pressure source is an oil tank battery, location of pressure sensor 26 at the high-pressure source provides the advantage of precise measurement and control of pressure within the tanks, which are critically sensitive to pressure. Other remote high-pressure locations, such as at the wellhead of a natural gas well or the annulus gas pressure, may also be monitored by pressure sensor 26. Continuing with this example, when the tanks are the high-pressure source, the low-pressure source may be the use of the compressor to pull casing gas to a vacuum condition.

When remote sensor 26 monitors a low-pressure source [B], the low-pressure sensor may be located at any convenient location suitable for monitoring the low-pressure source(s) gas pressure. When a plurality of low-pressure sources [B] are associated with low-pressure line 18, then remote pressure sensor 26 is associated or installed in that component deemed to be most critical to the safe operation of the system. Thus, in the typical operating environment, PLC 11 receives a single low-pressure input. Although a plurality of remote pressure sensors 26 may be associated with the various low-pressure sources in a system, the method of the present invention will normally monitor only that low-pressure source considered critical to safe operation of the system. All other lower pressure sources, if any, will be in fluid communication with the critical low-pressure source through a manifold.

As noted above, backpressure regulator 22 controls pressure within the lines from the high-pressure source [A] to either the manifold or high-pressure line 16. If pressure at the high-pressure source [A] drops below the predetermined value for the backpressure regulator 22, the valve within or controlled by backpressure regulator 22 will close precluding backflow to the high-pressure source [A]. Thus, backpressure regulator 22 only opens when pressure at high-pressure source [A] is greater than the predetermined minimum limit. Suction controller 23 operates as choke valve that manages output pressure from the high-pressure source [A]. Suction controller 23 fully opens when output pressure drops below a predetermined limit.

Pressure sensors 24 and 26 continuously provide data input to PLC, thereby allowing PLC 11 to manage compressor 10 in a manner to ensure maintenance of the target high and low pressures for each portion of the natural gas collection system. In the current embodiment of the invention, pressure sensors 24 and 26 provide analog input to PLC 11.

Thus, the configuration of the system permits the efficient management of a plurality of high- and low-pressure sources commonly found at well sites and processing facilities. In the described system, PLC 11 manages compressor speeds via an analog output. As known to those skilled in the art, PLCs can be configured for use with compressors driven by internal combustion engines or compressors driven by electric motors. For compressors driven by internal combustion engines, PLC 11 provides a signal to a governor that controls the engine speed. PLC 11 output to the engine governor will be in the range 0 to 10 volts. For compressors driven by electric motors, the speed of the electric motor is managed by a variable frequency drive (VFD). In this configuration, PLC 11 is configured to provide an output between 4 and 20 milliamps. As will be recognized by those skilled in the art, the type of analog output signal may be different to accommodate the various components used in the compressor system.

As will be described in more detail below with regard to a variety of specific embodiments, the method of the present invention uses PLC 11 to manage changes in the speed and capacity of compressor 10. PLC 11 adjusts compressor operation to maintain the user defined targeted pressures for both the high-pressure [A] and low-pressure sources [B]. If a high-pressure source [A] varies from the desired target, PLC 11 will receive a signal from pressure sensor 24 indicating either high or low variance. PLC 11 will then transmit a signal to the speed control mechanism (governor or VFD) managing the drive mechanism associated with the compressor. The engine or electric motor will change speeds as necessary to either increase or decrease compressor 10 speed and capacity thereby returning the monitored high-pressure source [A] to the targeted value.

As noted above, remote pressure sensor 26 will generally be associated with one or more low-pressure sources [B]. Remote pressure sensor 26 generally monitors only the critical low-pressure source. As in the case of an out-of-variance signal from sensor 24, PLC 11 receives an out-of-variance signal from remote pressure sensor 26 and signals the speed control mechanism managing the drive mechanism associated with the compressor to adjust compressor speed and capacity as necessary to return the monitored low-pressure source to the targeted value. Thus, the present invention provides the ability to manage line pressure for both high-pressure sources [A] and low-pressures sources [B] using a single compressor. Further, the system provides pressure management for a plurality of each type of natural gas source using a single compressor.

The change in compressor speed required to return the pressure source to the user defined targeted pressure is derived by use of a PID algorithm. As known to those skilled in the art, PID algorithms are built-in functions of the PLC. Each source has a target and each target's PID calculation commands an interpreted speed requirement, or manipulated value, i.e. the result of the PID calculation. A sequence of logic in the PLC then chooses which target's interpreted speed requirement will be used by comparing the manipulated values of each and forcing the highest value into the memory register of all of PID manipulated values, creating a smooth transition between control of one target to another at any given moment. In other words, all targets derive a suggested speed based on the associated pressure measurement. The PLC then compares all of these suggested speeds and then moves the highest value of the compared speeds in place of the lower values so that the pressure target requiring the greatest speed output at any given moment will be the pressure target used to adjust the compressor speed. Additionally, this programming technique is used to prevent a shutdown due to excessive discharge pressure or, where applicable, excessive motor current, i.e. motor load. Each of these limiting factors is given user defined targets and has PID calculations. In order to slow the compressor for the reduction of discharge pressure or motor current, those PIDs derive a speed output that is compared to the aforementioned pressure controlling PIDs associated with the high- and low-pressure sources. The lowest manipulated value resulting from this comparison is the derived speed output. In other words, if the limiting factors are not reached, their respective PIDs will command full speed, but the gas source pressure PIDs may not be commanding full speed and thereby are the controlling factors. If the limiting factors are reached, their respective PIDs will command a reduced speed and if the source gas PIDs command a higher throttle, the limiting factor PIDs will override the speed output as a result of the compare statement as outlined in the flowchart FIG. 10.

Figure 10:
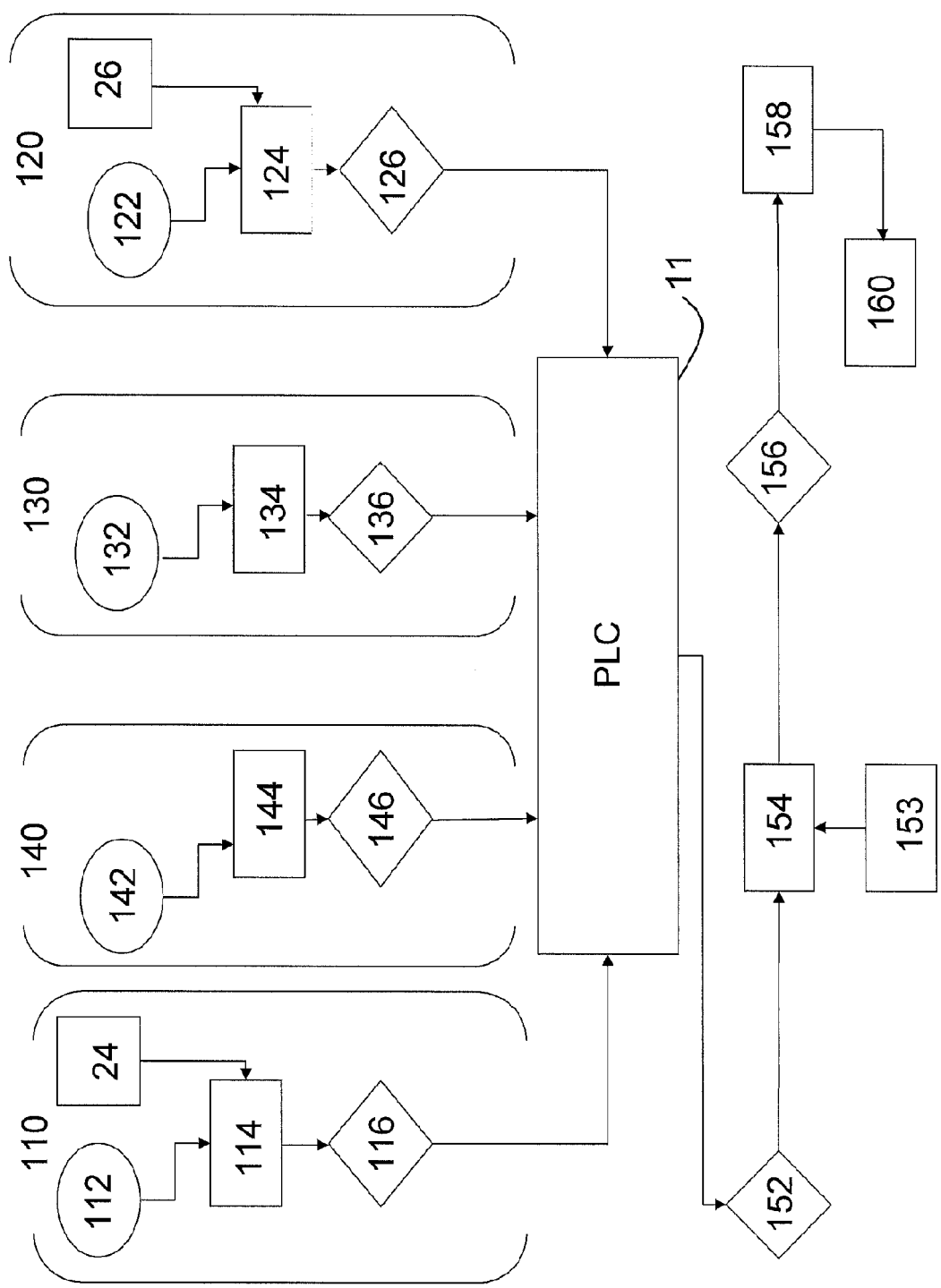
FIG. 10 depicts a flow chart for multiple and cascading PIDs appropriate for use in the present invention.

Thus, the above process logic implements multiple and cascading PIDs to control compressor speed. FIG. 10 provides a process logic flow chart depicting the above sequence of steps. As discussed above, compressor speed is adjusted by controlling either engine or electric motor speed, thereby in turn adjusting compressor capacity. The PID calculation occurs with every PLC program scan cycle (multiple times per second) and the selection of the interpreted speed requirements occurs with every scan cycle, thus allowing the control to continuously vary as needed for any pressure source that may be out-of-variance with the target pressure as measured by the sensor for that source.

With continued reference to the FIGS., the method of the present invention monitors the high-pressure [A] and low-pressure [B] sources. PLC 11 is programmed with a predetermined and user adjustable target for each monitored pressure. If the monitored pressure at either source varies above the target range, then PLC 11 directs an increase in compressor speed thereby adjusting the drawing of gas until the pressure value returns to the target. If the monitored pressure at both sources varies below their respective target values, then PLC 11 directs a decrease in compressor speed thereby adjusting the drawing of gas until at least one sensor indicates a return to the target pressure value. Once the pressure has returned to the target, PLC 11 directs the compressor to maintain speed until the pressure value differs from the desired target. Some compressor models include capacity control features in addition to speed variance further increasing the compressor's range of control. For example, some compressor packages may utilize a variety of unloading valves configured to control the throughput capacity of the compressor. Thus, when operating with a compressor having unloading valves, PLC 11 will also provide operational control over management of the unloading valves.

Continuing with reference to FIG. 10, FIG. 10 provides one example of a flow chart for multiple and cascading PIDs appropriate for use in the present invention. Those skilled in the art would be familiar with the programming associated with the use of PLC 11. As depicted in FIG. 10, high-pressure sensor 24 and low-pressure sensor 26 provide input to PLC 11. In path 110, a user defined high-pressure input value 112 is provided. The value from sensor 24 is compared at step 114 to user defined input value 112 and a manipulated value 116 is generated reflecting the speed adjustment in the compressor necessary to produce the desired user defined input value 112. Likewise in path 120, a user defined input value 122 for the low-pressure value, such as a tank pressure value, is provided. The monitored pressure at low-pressure sensor 26 is compared at step 124 to user defined value 122 and a manipulated value 126 generated reflecting the adjustment to compressor speed necessary to maintain the desired low-pressure value 122. Path 120 is used with a vapor pressure sensor 26 associated with vapor recovery tower 32 as depicted in FIGS. 1-5 or with a vapor pressure sensor 26 only associated with a tank as depicted in FIGS. 6-9. Similarly in path 130, a user defined maximum motor current value 132 is provided for comparison to the sensed motor current as provided by a motor current transmitter (not shown) associated with the an electric motor driving the compressor. In step 134, the reported motor current value is compared to user defined value 132 and a manipulated value 136 generated reflecting the adjustment necessary for control of the electric motor to maintain a load that is equal to or less than the desired maximum motor current. Note: similar values would be provided by monitoring engine operating parameters of the internal combustion engine instead of an electric motor. Finally, path 140 relates to management of discharge pressure of compressor 10, a user defined maximum compressor discharge pressure target value 142 will be provided for comparison to monitored discharge pressure. In step 144, the monitored discharge pressure of compressor 10 is compared to user defined value 142 and a manipulated value 146 generated reflecting the adjustment to compressor speed necessary to maintain the desired discharge value 142. The logic sequence established in PLC 11 utilizes the manipulated values to generate a speed reference 152. The speed reference is compared to the average speed 153 of the electric motor or engine at step 154 to generate a manipulated value 156. As known to those skilled in the art, motor or engine speed may be monitored by a sensor (not shown) suitable for providing speed input necessary to determine average engine/motor speed. In step 158, manipulated value 156 is provided as an input to the control device used to manage the speed of the electric motor (variable frequency drive controller 160) or internal combustion engine (governor 160). Thus, PLC 11 provides for automatic control of the system. Additionally, paths 140 and 130 provide enhanced runtime features, i.e. override functions, as a value in either path greater than a predetermined value will direct the PLC to reduce capacity, thus avoiding the use of the shutdowns for high discharge pressure or high load.

The following non-limiting examples will describe the various configurations of high-pressure [A] and low-pressure [B] sources represented in the FIGS. As background for the examples, typical high-pressure sources [A] include: flash separators, multi-phase separators, gas well production tubing associated with plunger lift systems, heater treaters associated with production units, and continuous flow gas wells. Common low-pressure sources [B] include: oil tank batteries with or without vapor recovery towers, annulus head gas, wellhead gas production, trunk line booster. As discussed above, low-pressure sources [B] are defined relative to the high-pressure source managed by the current method and system. Thus, in one configuration a source may be a low-pressure source; yet, in another configuration, the same source may be managed as a high-pressure source.

Example 1

In this example, the natural gas high-pressure sources include a flash separator [A1] with a backpressure control valve 22 set at 30 psig and a plunger lift gas well [A2] with a suction controller 23 set to limit compressor inlet pressure to about 40 psig. As depicted, sensor 24 associated with the compressor inlet monitors the high-pressure sources. In this example, the target pressure associated with the local sensor 24 is set at 5 psig; however, the high-pressure target may be any user determined value as determined by the operating environment. The low-pressure source [B] of natural gas is a tank farm associated with a vapor recovery tower 32. Since a positive internal pressure within the tanks is critical to tank structural integrity and oxygen mitigation, pressure on the low-pressure side will be monitored at vapor recovery tower 32 by remote pressure sensor 26. The target pressure in this example that is associated with remote pressure sensor 26 is set at 0.25 psig. Note: the flash separator also includes a fluid line 28 carrying liquids with entrained natural gas to vapor recovery tower 32 (VRT). Since this is a liquid line, a pressure sensor is not required to monitor this line.

Thus, under operating conditions, PLC 11 monitors local sensor 24 at the compressor inlet and remote pressure sensor 26 to control operation of the compressor. If pressure at the inlet 12 exceeds 5 psig, then PLC 11 will direct an increase in compressor speed. Likewise, if pressure at sensor 26 on the VRT is greater than 0.25 psig, then PLC 11 will direct an increase in compressor speed. Further, if both sensor 24 and sensor 26 indicate pressures lower than the targeted values of 5 psig and 0.25 psig, then PLC 11 will direct a decrease in compressor speed.

In addition to directing or commanding a change in operation of the compressor sufficient to return the sensed pressure to the target, PLC 11 preferably includes programming to control the manner or rate at which the compressor operates in returning the sensed pressure to the desired target. The controlled return to target value allows the system to achieve the target pressure without over-shooting. Thus, the system avoids repetitive corrections to achieve the target pressure.

The controlled return to target pressure will be tailored to the individual units associated with the natural gas recovery system. In general, each source will have a different optimum compressor response setting for achieving the target pressure based on the degree of variance. Further, if a high-pressure source is flowing at rate sufficient to close check valve 19, then sensor 26 will likely continue to read above the target value following return of sensor 24 to the target value. As such, PLC 11 will continue to direct compressor operation to restore the pressure value at sensor 26 to the desired target following the process control discussed above. Thus, much like a cruise control managing automobile speed on hilly terrain, the PLC uses the PID calculations to preclude dropping substantially below the target value within the low-pressure sources.

Subsequent FIGS. 2-9 depict configurations wherein single compressor 10 and PLC 11 manages and controls natural gas pressure in response to continuous signals received from pressure sensors 24 and 26. As depicted in the FIGS., high-pressure sources are identified by the letter [A] and low-pressure sources are identified by the letter [B].

Figure 2:
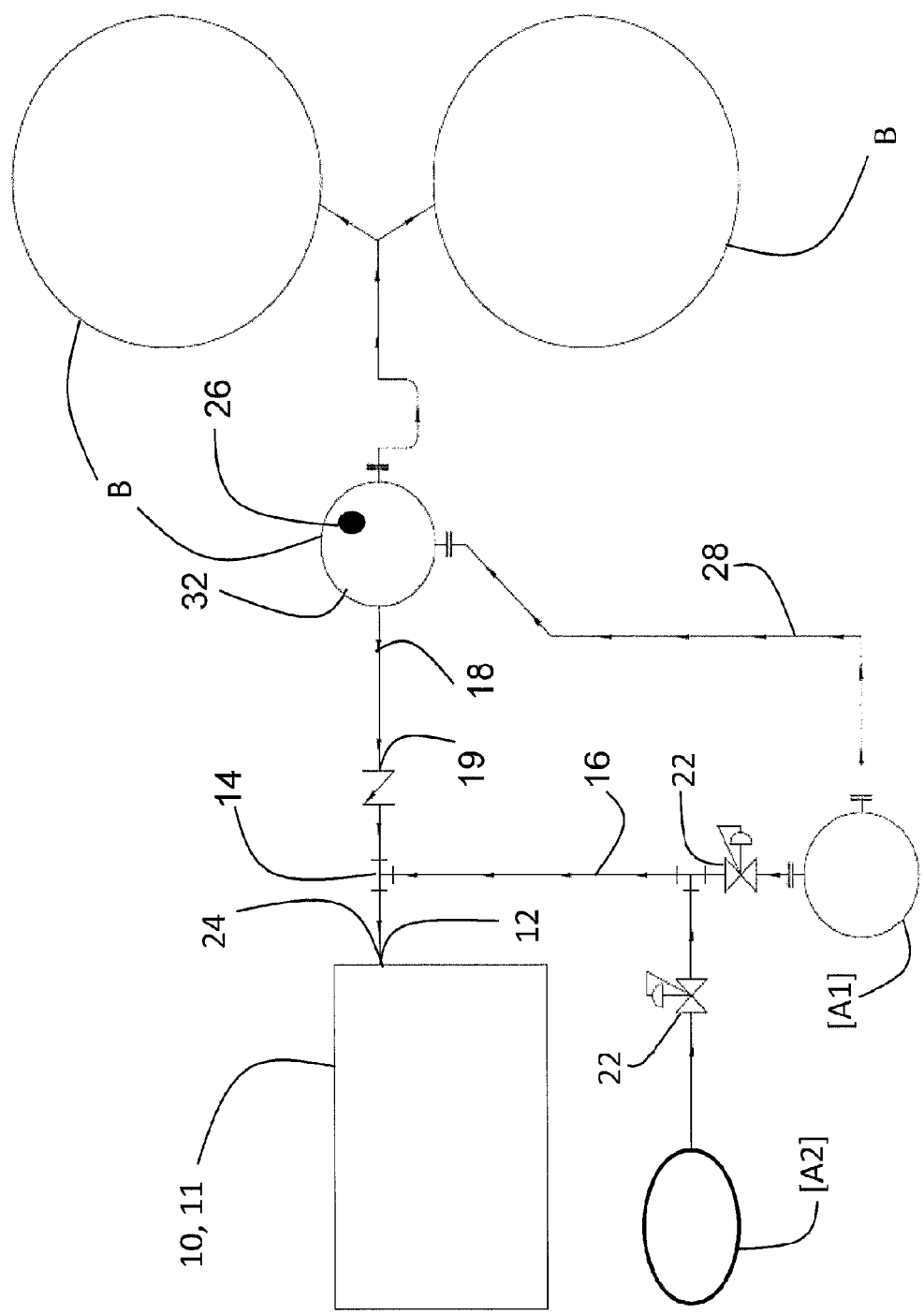

In the example depicted by FIG. 2, the plunger lift gas well high-pressure source [A2] has been replaced by annulus casing head gas with produced gas passing through a backpressure regulator 22. All other operating characteristics in FIG. 2 will correspond to the discussion of FIG. 1.

Figure 3:
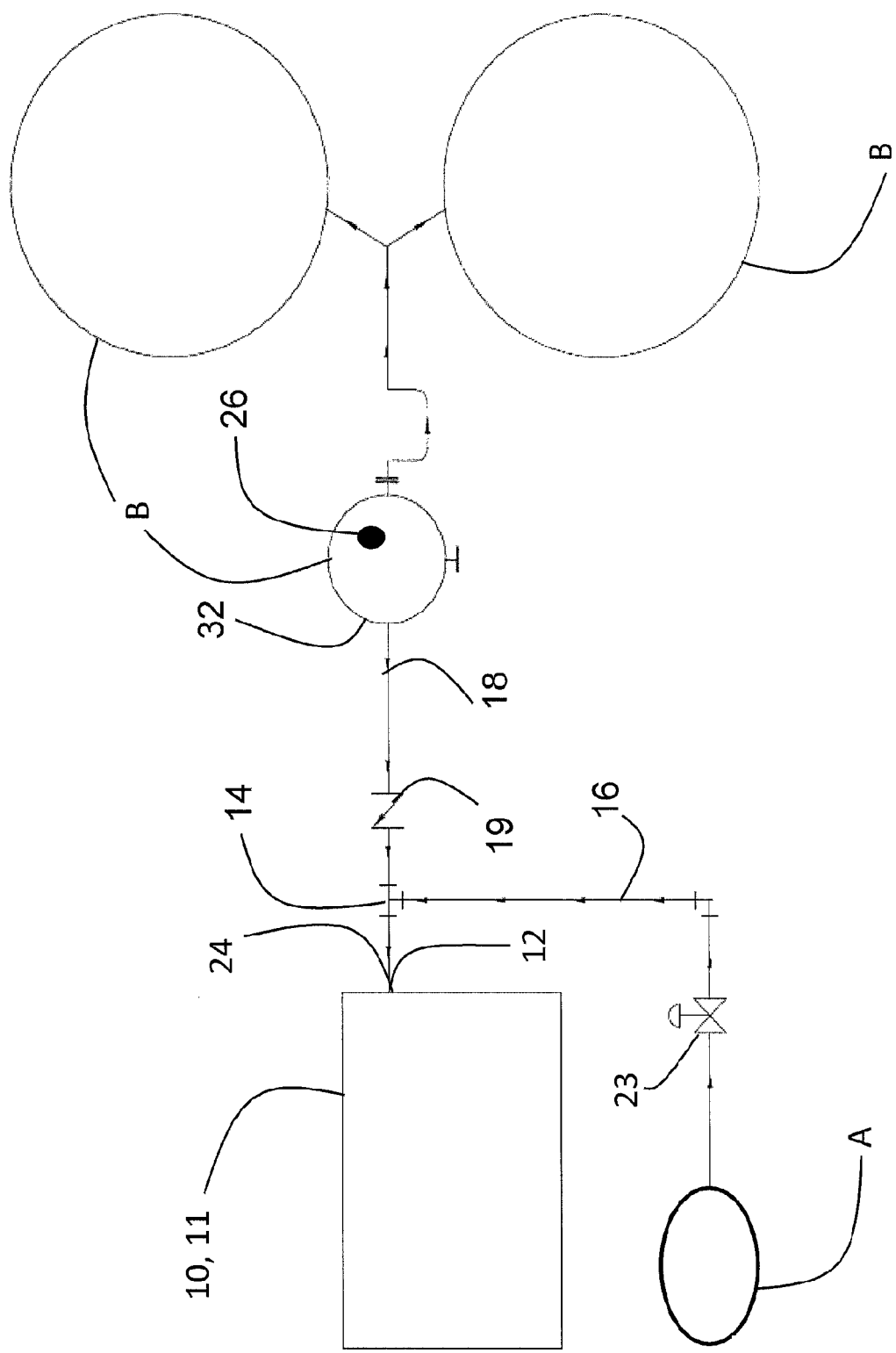
FIGS. 3-5 depict configurations of the present invention having a single high-pressure source and a vapor recovery tower as the monitored low-pressure source of hydrocarbon gas.
Figure 4:
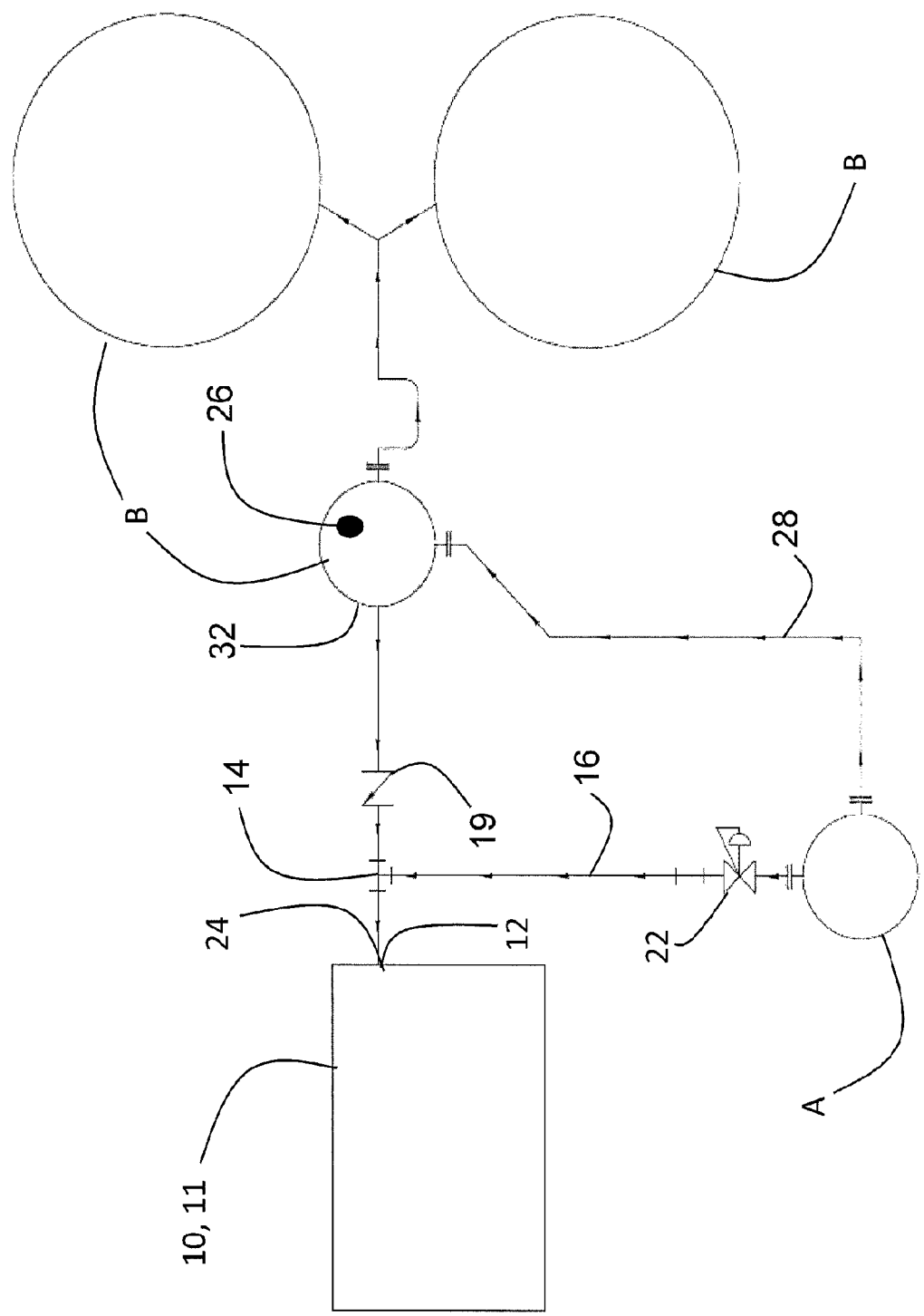
Figure 5:
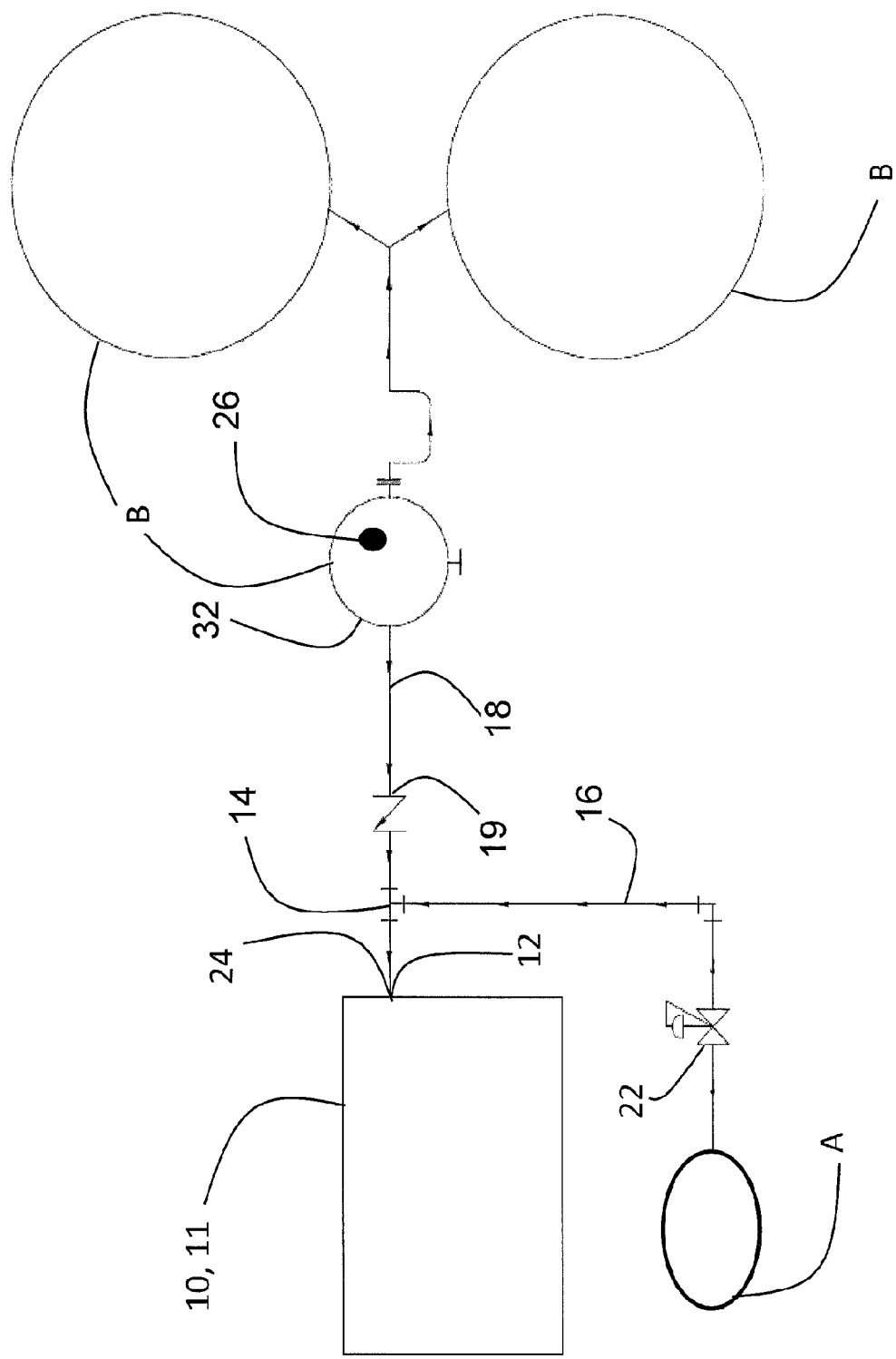

FIGS. 3-5 depict other variations with a single high-pressure source flowing through either a suction controller 23 or a backpressure regulator 22.

Figure 6:
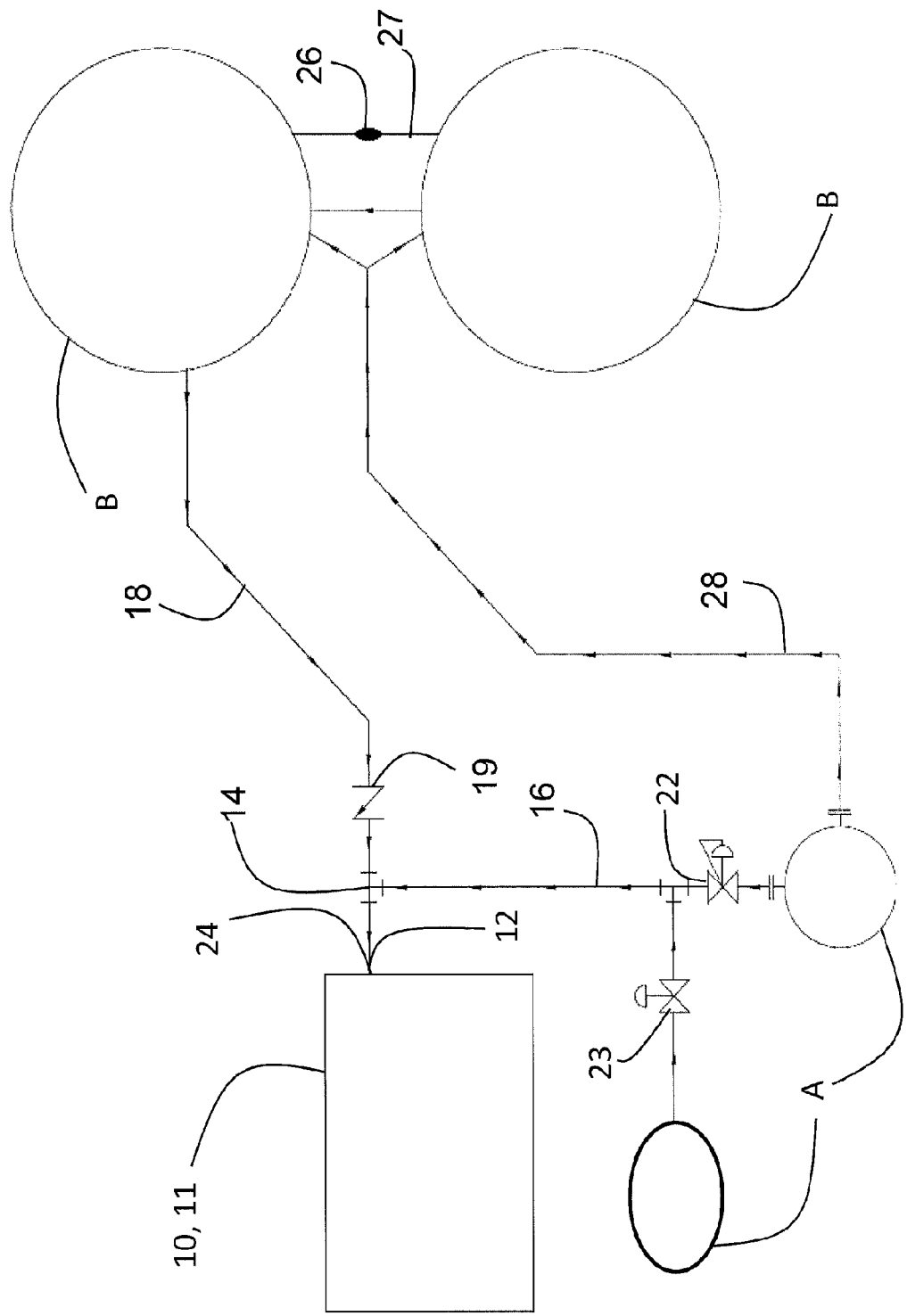
FIGS. 6 and 7 depict configurations of the present invention with two high-pressure sources and a tank farm as the monitored low-pressure source of hydrocarbon gas.

In the example depicted by FIG. 6, the vapor recovery tower depicted in FIG. 1 has been eliminated. In this configuration, the tank farm is the low-pressure source [B]. When the low-pressure source [B] is two or more tanks, pressure sensor 26 will preferably be located either on a non-flowing line providing pressure equalization between all tanks or on a centrally located tank in fluid communication with all tanks. As depicted in FIG. 6, pressure sensor 26 is on pressure equalization conduit 27 providing fluid communication between the two tanks. However, by design, conduit 27 does not provide for normal transport of gas into or out of the tanks. As in FIG. 1, line 28 is a liquids line providing fluid communication between the flash separator and the tanks. The liquid passing to the tanks includes entrained natural gas which will eventually separate from the liquids after a period of time in the tanks. Operationally, PLC 11 in FIG. 6 will maintain target pressure in the same manner as discussed with regard to FIG. 1.

Figure 7:
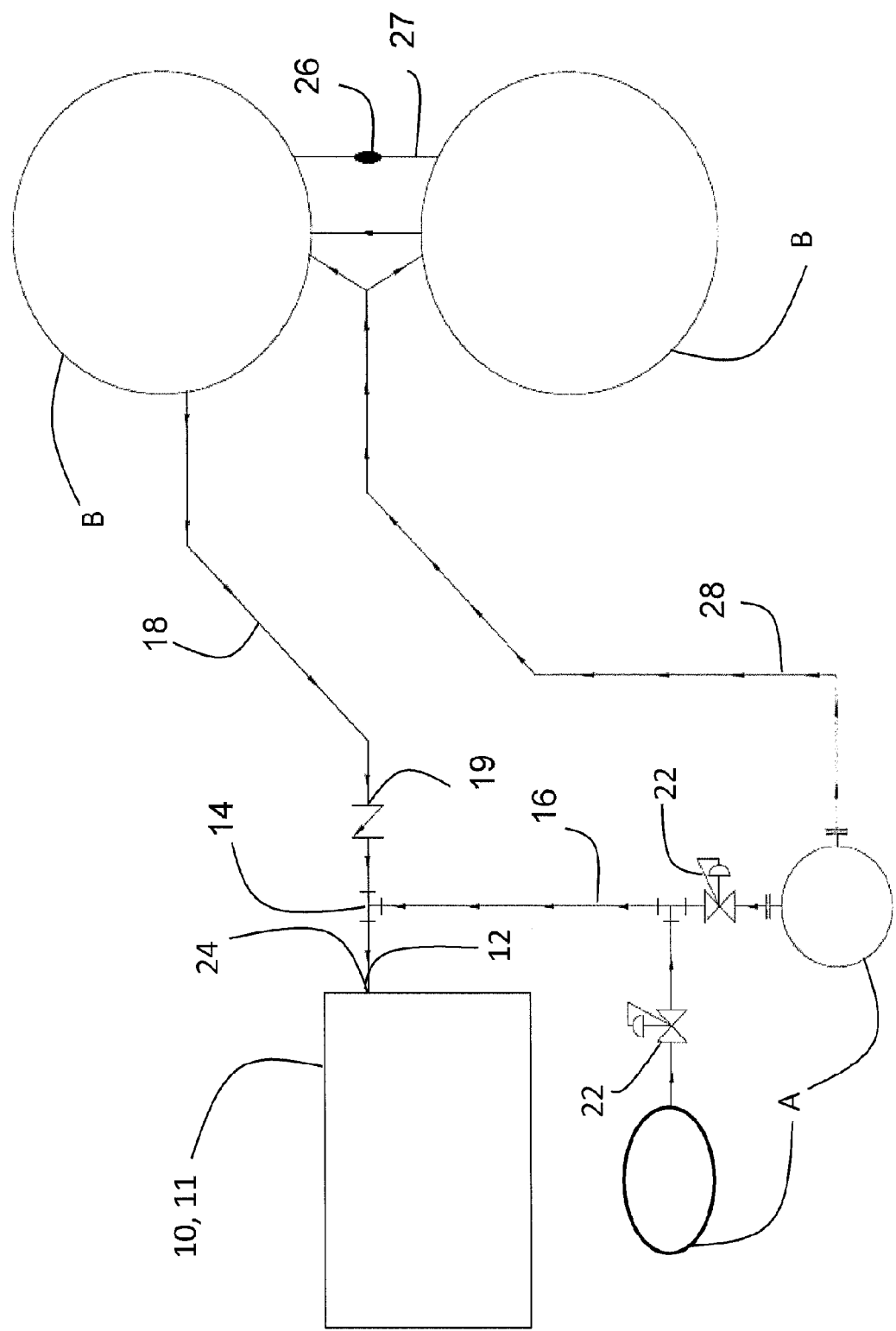

FIG. 7 corresponds in operation to FIG. 2; however, the vapor recovery tower has been eliminated from the system resulting in movement of remote sensor 26 to equalization conduit 27.

Figure 8:
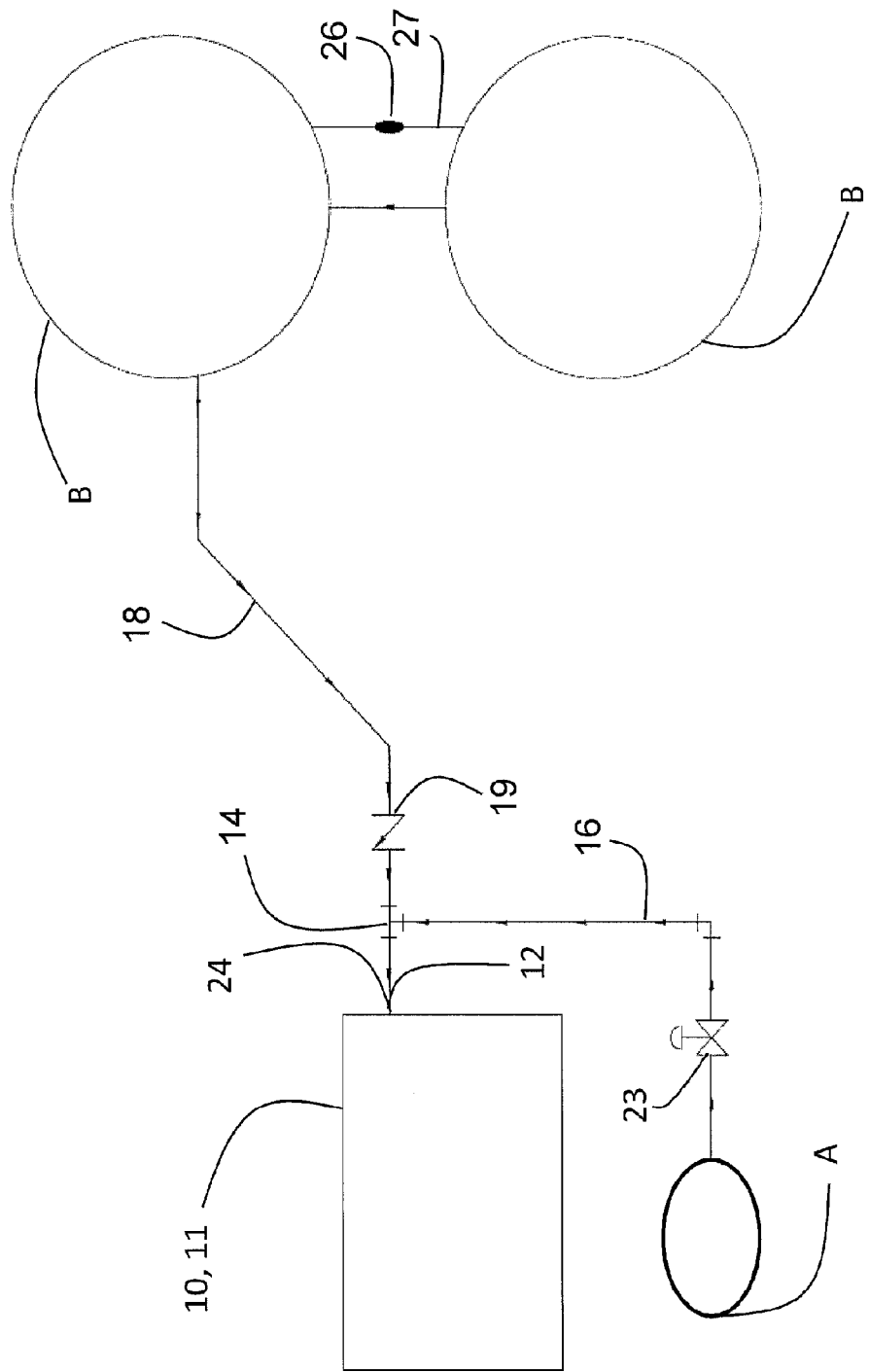
FIGS. 8 and 9 depict configurations of the present invention having a single high-pressure source and a tank farm as the monitored low-pressure source of hydrocarbon gas.

FIG. 8 corresponds in operation to FIG. 3; however, the vapor recovery tower has been eliminated from the system resulting in movement of remote sensor 26 to equalization conduit 27.

Figure 9:
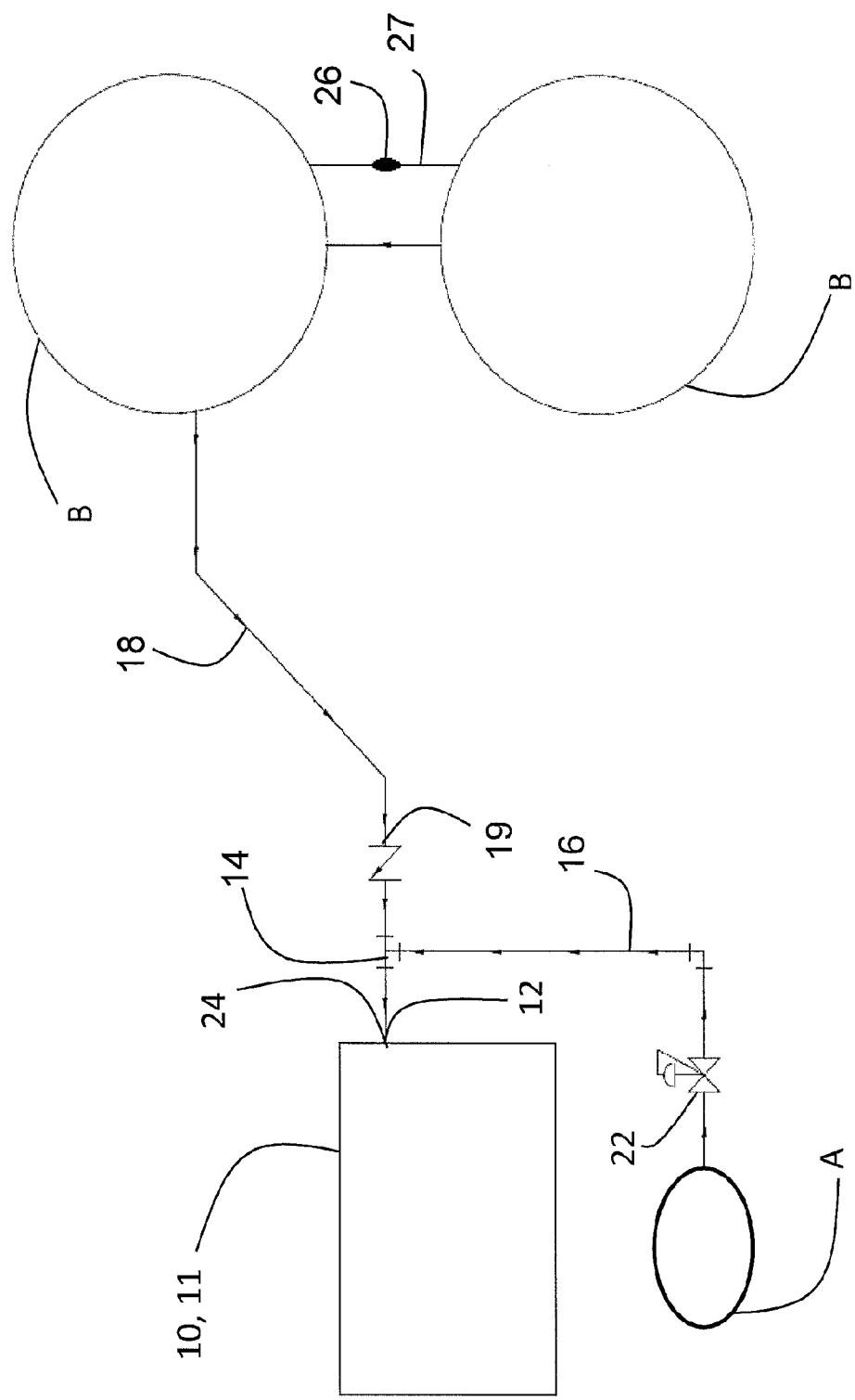

FIG. 9 corresponds in operation to FIG. 5; however, the vapor recovery tower has been eliminated from the system resulting in movement of remote sensor 26 to equalization conduit 27.

Other embodiments of the current invention will be apparent to those skilled in the art from a consideration of this specification or practice of the invention disclosed herein. Thus, the foregoing specification is considered merely exemplary of the current invention with the true scope and spirit of the invention being defined by the following claims.

The invention claimed is:

1. A system configured to monitor and manage natural gas pressure within a plurality of sources, the system comprising:
    at least one low-pressure source of natural gas;
    at least one high-pressure source of natural gas;
    a low-pressure line in fluid communication with said at least one low-pressure source of natural gas;
    a high-pressure line in fluid communication with said at least one high-pressure source of natural gas;
    a first junction joining said high-pressure line and said low-pressure line;
    a compressor having an inlet, said inlet in fluid communication with said first junction;
    a pressure sensor monitoring the gas pressure at said inlet;
    a remote pressure sensor monitoring a gas pressure at a location remote from said compressor;
    a drive mechanism suitable for operating said compressor;
    a programmable logic controller, said programmable logic controller configured to receive input data from said pressure sensor monitoring the gas pressure at said inlet and configured to receive input data from said remote pressure sensor, said programmable logic controller further configured to provide output data to control the operation of said drive mechanism operating said compressor.

2. The system of claim 1, further comprising a pressure control valve positioned in said high-pressure line between said at least one high-pressure source of natural gas and said first junction.

3. The system of claim 2, wherein said pressure control valve is a backpressure regulator.

4. The system of claim 2, wherein said pressure control valve is a suction controller.

5. The system of claim 1, wherein said remote pressure sensor monitors the pressure of the at least one low-pressure source.

6. The system of claim 1, further comprising at least one additional remote pressure sensor associated with an additional low-pressure source.

7. The system of claim 1, comprising at least two high-pressure sources of natural gas wherein each high-pressure source of natural gas is in fluid communication with said high-pressure fluid line via a second junction, positioned between each high-pressure source of natural gas and said second junction is a pressure control valve.

8. The system of claim 1, comprising at least two low-pressure sources of natural gas and a vapor recovery tower, said low-pressure sources of natural gas in fluid communication with said vapor recovery tower and said vapor recovery tower in fluid communication with said first junction joining said high-pressure line and said low-pressure line.

9. The system of claim 1, comprising at least two low-pressure sources of natural gas, said low-pressure sources having a first fluid path providing transport of fluids between said low-pressure sources and a second fluid path providing pressure equalization between said low-pressure sources and wherein said pressure sensor is a low-pressure sensor positioned to determine pressure within said second fluid path.

10. The system of claim 1, wherein said high-pressure source is selected from the group consisting of: flash separators, multi-phase separators, gas well production tubing associated with plunger lift systems, heater treaters associated with production units, and continuous flow gas wells.

11. The system of claim 1, wherein said low-pressure source is selected from the group consisting of: oil tank batteries, annulus head gas, wellhead gas production, trunk line booster.

12. The system of claim 2, wherein when said high-pressure source is a continuous flow gas well, said pressure control valve is a suction controller.

13. A system configured to monitor and manage natural gas pressure within a plurality of sources, the system comprising:
    at least one low-pressure source of natural gas;
    at least one high-pressure source of natural gas;
    a low-pressure line in fluid communication with said at least one low-pressure source of natural gas;
    a high-pressure line in fluid communication with said at least one high-pressure source of natural gas;
    a first junction joining said high-pressure line and said low-pressure line;
    a compressor having an inlet, said inlet in fluid communication with said first junction;
    a first pressure sensor monitoring the gas pressure at said inlet;
    a second pressure sensor monitoring the gas pressure at said low-pressure source or within said low-pressure line;
    a drive mechanism suitable for operating said compressor;
    a programmable logic controller, said programmable logic controller configured to receive input data from said first pressure sensor monitoring the gas pressure at said inlet and configured to receive input data from said second pressure sensor monitoring the gas pressure at said low-pressure source or within said low-pressure line, said programmable logic controller further configured to provide output data to control the operation of said drive mechanism operating said compressor.

14. The system of claim 13, further comprising a pressure control valve positioned in said high-pressure line between said high-pressure source of natural gas and said first junction.

15. The system of claim 14, wherein said pressure control valve is a backpressure regulator.

16. The system of claim 14, wherein said pressure control valve is a suction controller.

17. The system of claim 13, wherein said second pressure sensor monitors the pressure of the low-pressure source.

18. The system of claim 13, further comprising at least one additional remote pressure sensor associated with an additional low-pressure source.

19. The system of claim 13, comprising at least two high-pressure sources of natural gas wherein each high-pressure source of natural gas is in fluid communication with said high-pressure fluid line via a second junction, positioned between each high-pressure source of natural gas and said second junction is a pressure control valve.

20. The system of claim 13, comprising at least two low-pressure sources of natural gas and a vapor recovery tower, said low-pressure sources of natural gas in fluid communication with said vapor recovery tower and said vapor recovery tower in fluid communication with said first junction joining said high-pressure line and said low-pressure line.

21. The system of claim 13, comprising at least two low-pressure sources of natural gas, said low-pressure sources having a first fluid path providing transport of fluids between said low-pressure sources and a second low-pressure line providing pressure equalization between said low-pressure sources wherein said second pressure sensor is positioned to determine pressure within said second low-pressure line.

22. The system of claim 13, wherein said high-pressure source is selected from the group consisting of: flash separators, multi-phase separators, gas well production tubing associated with plunger lift systems, heater treaters associated with production units, and continuous flow gas wells.

23. The system of claim 13, wherein said low-pressure source is selected from the group consisting of: oil tank batteries, annulus head gas, wellhead gas production, trunk line booster.

24. The system of claim 14, wherein when said high-pressure source is a continuous flow gas well, said pressure control valve is a suction controller.

25. A method, using a single compressor, for recovering natural gas from at least one high-pressure source of natural gas and at least one low-pressure source of natural gas comprising the steps of:
  recovering natural gas from at least one high-pressure source of natural gas;
  recovering natural gas from at least one low-pressure source of natural gas;
  establishing a target natural gas pressure for said at least one low-pressure source of natural gas;
  establishing a target natural gas pressure for said at least one high-pressure source of natural gas;
  using a first pressure sensor to monitor said natural gas pressure of said at least one low-pressure source of natural gas, said pressure sensor producing a signal corresponding to said monitored low pressure value;
  using a second pressure sensor to monitor said natural gas pressure of said at least one high-pressure source of natural gas, said second pressure sensor producing a signal corresponding to said monitored high pressure value;
  communicating said monitored pressure values to a programmable logic controller, said programmable logic controller configured to interpret said monitored pressure values;
  said programmable logic controller determining if said monitored pressure values correspond to the established targets;
  if said monitored pressure values do not correspond to the established targets, said programmable logic controller directs the increase or decrease of compressor capacity by directing a drive mechanism operating said compressor to increase or decrease operational speed.

26. The method of claim 25, wherein when the monitored low pressure value produced at said first pressure sensor is less than the established target natural gas pressure for said low-pressure source of natural gas, said programmable logic controller directs a decrease in compressor speed by directing a drive mechanism operating said compressor to decrease operational speed, upon establishment of the target natural gas pressure for said low-pressure source said programmable logic controller directs the compressor to maintain speed until a subsequent detection of monitored pressure values different from established targets.

27. The method of claim 25, wherein when the monitored high pressure value produced at said second pressure sensor is less than the established target natural gas pressure for said high-pressure source of natural gas, said programmable logic controller directs decrease of compressor speed by directing a drive mechanism operating said compressor decrease operational speed, upon establishment of the target natural gas pressure for said high-pressure source said programmable logic controller directs the compressor to maintain speed until a subsequent detection of monitored pressure values different from established targets.

28. The method of claim 25, wherein when the monitored low pressure value produced at said first pressure sensor is greater than the established target natural gas pressure for said low-pressure source of natural gas, said programmable logic controller directs the increase compressor speed by directing a drive mechanism operating said compressor to increase operational speed, upon establishment of the target natural gas pressure for said low-pressure source said programmable logic controller directs the compressor to maintain speed until a subsequent detection of monitored pressure values different from established targets.

29. The method of claim 25, wherein when the monitored high pressure value produced at said second pressure sensor is greater than the established target natural gas pressure for said high-pressure source of natural gas, said programmable logic controller directs the increase of compressor speed by directing a drive mechanism operating said compressor to increase operational speed, upon establishment of the target natural gas pressure for said high-pressure source said programmable logic controller directs the compressor to maintain speed until a subsequent detection of monitored pressure values different from established targets.

30. A system configured to monitor and manage natural gas pressure within a plurality of sources, the system comprising:
  at least one low-pressure source of natural gas selected from the group consisting of oil tank batteries, annulus head gas, wellhead gas production and trunk line booster;
  at least one high-pressure source of natural gas selected from the group consisting of flash separators, multi-phase separators, gas well production tube associated with plunger lift systems, heater treaters associated with production units and continuous flow gas wells;
  a low-pressure line in fluid communication with said at least one low-pressure source of natural gas;
  a high-pressure line in fluid communication with said high-pressure source of natural gas;
  a junction joining said high-pressure line and said low-pressure line;
  a compressor having an inlet, said inlet in fluid communication with said junction;
  a pressure sensor monitoring the gas pressure at said inlet;
  a remote pressure sensor monitoring the gas pressure at a location remote from said compressor;

a drive mechanism suitable for operating said compressor;

a programmable logic controller, said programmable logic controller configured to receive input data from said pressure sensor monitoring the gas pressure at said inlet and configured to receive input data from said remote pressure sensor, said programmable logic controller further configured to provide output data to control the operation of said drive mechanism operating said compressor.

31. A system configured to monitor and manage natural gas pressure within a plurality of sources, the system comprising:

at least one low-pressure source of natural gas selected from the group consisting of oil tank batteries, annulus head gas, wellhead gas production and trunk line booster;

at least one high-pressure source of natural gas selected from the group consisting of flash separators, multiphase separators, gas well production tube associated with plunger lift systems, heater treaters associated with production units and continuous flow gas wells;

a low-pressure line in fluid communication with said at least one low-pressure source of natural gas;

a high-pressure line in fluid communication with said high-pressure source of natural gas;

a junction joining said high-pressure line and said low-pressure line;

a compressor having an inlet, said inlet in fluid communication with said junction;

a pressure sensor monitoring the gas pressure at said inlet;

a pressure sensor monitoring the gas pressure at said low-pressure source or within said low-pressure line;

a drive mechanism suitable for operating said compressor;

a programmable logic controller, said programmable logic controller configured to receive input data from said pressure sensor monitoring the gas pressure at said inlet and configured to receive input data from said pressure sensor monitoring the gas pressure at said low-pressure source or within said low-pressure line, said programmable logic controller further configured to provide output data to control the operation of said drive mechanism operating said compressor.

32. A method, using a single compressor, for recovering natural gas from at least one high-pressure source of natural gas and at least one low-pressure source of natural gas comprising the steps of:

recovering natural gas from said at least one high-pressure source of natural gas selected from the group consisting of flash separators, multiphase separators, gas well production tube associated with plunger lift systems, heater treaters associated with production units and continuous flow gas wells;

recovering natural gas from said at least one low-pressure source of natural gas selected from the group consisting of oil tank batteries, annulus head gas, wellhead gas production and trunk line booster;

establishing a target natural gas pressure for said at least one low-pressure source of natural gas;

establishing a target natural gas pressure for said at least one high-pressure source of natural gas;

using a first pressure sensor to monitor said natural gas pressure of said at least one low-pressure source of natural gas, said first pressure sensor producing a low-pressure signal corresponding to said monitored low pressure value;

using a second pressure sensor to monitor said natural gas pressure of said at least one high-pressure source of natural gas, said second pressure sensor producing a signal corresponding to said monitored high pressure value;

communicating said monitored pressure values to a programmable logic controller, said programmable logic controller configured to interpret said monitored pressure values;

said programmable logic controller determining if said monitored pressure values correspond to the established targets;

if said monitored pressure values do not correspond to the established targets, said programmable logic controller directs the increase or decrease of compressor capacity by directing a drive mechanism operating said compressor to increase or decrease operational speed.

* * * * *